(12) United States Patent
Kim et al.

(10) Patent No.: US 8,685,308 B2
(45) Date of Patent: Apr. 1, 2014

(54) INJECTION MOLD FOR WASHING MACHINE DIAPHRAGMS

(75) Inventors: Hong Kon Kim, Hwaseong-si (KR); Man Ki Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/362,589

(22) Filed: Jan. 31, 2012

(65) Prior Publication Data
US 2012/0256350 A1    Oct. 11, 2012

(30) Foreign Application Priority Data
Apr. 7, 2011    (KR) .................. 10-2011-0032078

(51) Int. Cl.
*B29C 41/42*    (2006.01)

(52) U.S. Cl.
USPC .......................................... 264/334

(58) Field of Classification Search
USPC .......................................... 264/334
See application file for complete search history.

*Primary Examiner* — Larry Thrower
(74) *Attorney, Agent, or Firm* — Staas & Halsey LLP (57) ABSTRACT

Disclosed is an injection mold for washing machine diaphragms wherein the operations of an uppermost first slide core to support the upper part of a first step of a diaphragm manufactured in a cavity and a cam core to support the lower part of a second step of the manufactured diaphragm are controlled to automatically separate the manufactured diaphragm from the cavity.

5 Claims, 10 Drawing Sheets

INJECTION MOLD FOR WASHING MACHINE DIAPHRAGMS

CROSS-REFERENCE TO RELATED APPLICATIONS

This application claims the benefit of Korean Patent Application No. 10-2011-0032078, filed on Apr. 7, 2011 in the Korean Intellectual Property Office, the disclosure of which is incorporated herein by reference.

BACKGROUND

1. Field

The following embodiments disclosed herein relate to an injection mold to manufacture a diaphragm used in washing machines.

2. Description of the Related Art

Generally, a washing machine includes a main frame forming the external appearance of the washing machine, a water tub mounted in the main frame and a rotary tub rotatably mounted in the water tub. The main frame, the water tub and the rotary tub are provided with introduction ports, through which laundry is introduced into the rotary tub.

Also, the washing machine further includes a diaphragm to prevent leakage of water into the main frame through the introduction port of the water tub. The diaphragm is formed by compression-molding ethylene propylene diene monomer (EPDM) rubber. One end of the diaphragm is connected to the introduction port of the main frame and the other end of the diaphragm is connected to the introduction port of the water tub to prevent leakage of water from the water tub into the main frame.

SUMMARY

It is an aspect of the present invention to provide an injection mold for washing machine diaphragms that reduces a stripped pattern which may be formed when a diaphragm is manufactured by injection molding.

It is another aspect of the present invention to provide an injection mold for washing machine diaphragms that automatically separates a manufactured diaphragm.

Additional aspects of the invention will be set forth in part in the description which follows and, in part, will be apparent from the description, or may be learned by practice of the invention.

In accordance with an aspect of the present invention, an injection mold for a washing machine diaphragm, including a cylindrical body, a first undercut provided at a first step of the body and a second undercut provided at a second step of the body, includes a first core and second core disposed opposite to each other so that the distance between the first core and the second core is changed, a first intermediate core disposed between the first core and the second core, the outer side of the first intermediate core corresponding to the inner side of the body, a second intermediate core disposed outside the first intermediate core, the inner side of the second intermediate core corresponding to the outer side of the body, a plurality of movable first slide cores to form the first undercut together with the first core, and a plurality of movable second slide cores to form the second undercut together with the second core, wherein a cavity corresponding to the diaphragm is defined among the first core, the second core, the first intermediate core, the second intermediate core, the first slide cores and the second slide cores, and a molten thermoplastic elastic body is injected into the cavity to injection-mold the diaphragm.

The injection mold may further include a plurality of third slide cores movably mounted to outer sides of the second slide cores so that the third slide cores are interlocked with the second slide cores and interlocking pins by which the second slide cores are moved in a state in which the second slide cores are interlocked with the third slide cores after the third slide cores are moved a predetermined distance.

The injection mold may further include a runner to uniformly supply the molten thermoplastic elastic body into the cavity and a gate to guide the molten thermoplastic elastic body supplied through the runner to the cavity, wherein the gate may include a plurality of pin holes.

The runner may be provided in the first intermediate core, and the injection mold may further include a gate member, in which the gate constituted by the pin holes is provided, the gate member being provided in the first intermediate core so that the gate is connected to the runner.

The remainder of the first slide cores excluding an uppermost first slide core may be simultaneously moved outward in the radial direction as the first core is separated from the first intermediate core and the second intermediate core, and the uppermost first slide core may be moved outward in the radial direction after the second core is moved.

The injection mold may further include a movable cam core to support a lower part of the second end of the diaphragm manufactured in the cavity and a cam slide along which the cam core is moved so that the cam core is separated from the manufactured diaphragm.

In accordance with another aspect of the present invention, an injection mold for washing machine diaphragms includes a plurality of cores to form a cavity corresponding to a diaphragm to be manufactured, at least one runner to uniformly supply a molten thermoplastic elastic body into the cavity, and a gate, constituted by a plurality of pin holes, to guide the molten thermoplastic elastic body supplied through the runner to the cavity.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiments of the present invention, examples of which are illustrated in the accompanying drawings, wherein like reference numerals refer to like elements throughout.

Figure 1:
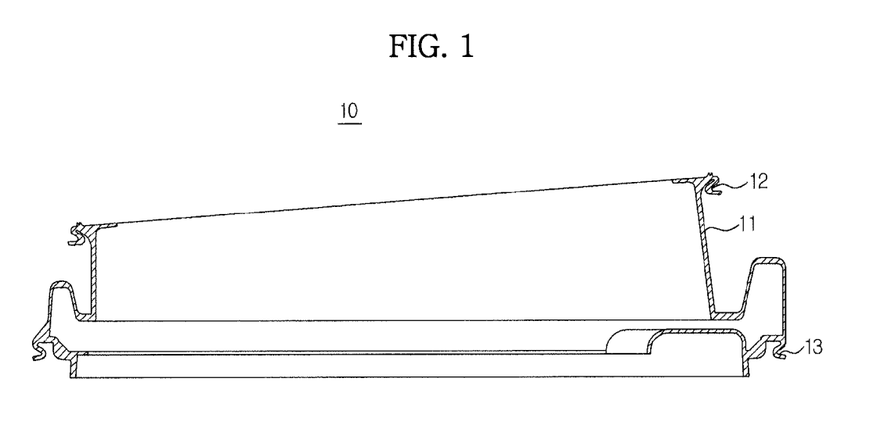
FIG. 1 is a sectional view showing a washing machine diaphragm according to an embodiment of the present invention.

FIG. 1 is a sectional view showing a washing machine diaphragm 10 manufactured by an injection mold for washing machine diaphragms according to an embodiment of the present invention.

The washing machine diaphragm 10 includes a cylindrical body 11, a first undercut 12 provided at a first step of the body 11 so that the first undercut 12 is connected to a main frame of the washing machine, and a second undercut 13 provided at a second step of the body 11 so that the second undercut 13 is connected to a water tub of the washing machine. In this embodiment, the diaphragm 10 is formed of a thermoplastic elastic body exhibiting elasticity like rubber at a room temperature and plasticity at a high temperature.

Figure 2:
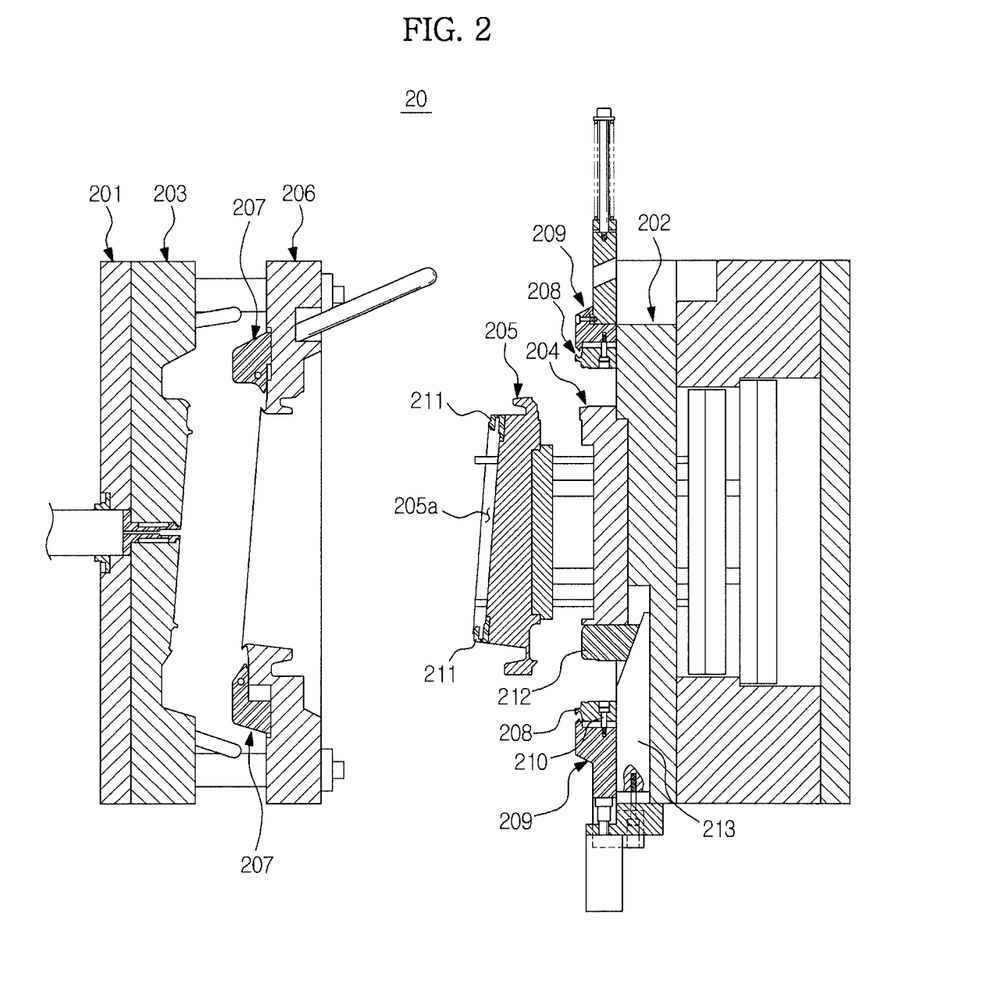
FIG. 2 is a sectional view showing an injection mold for washing machine diaphragms according to an embodiment of the present invention.
Figure 3:
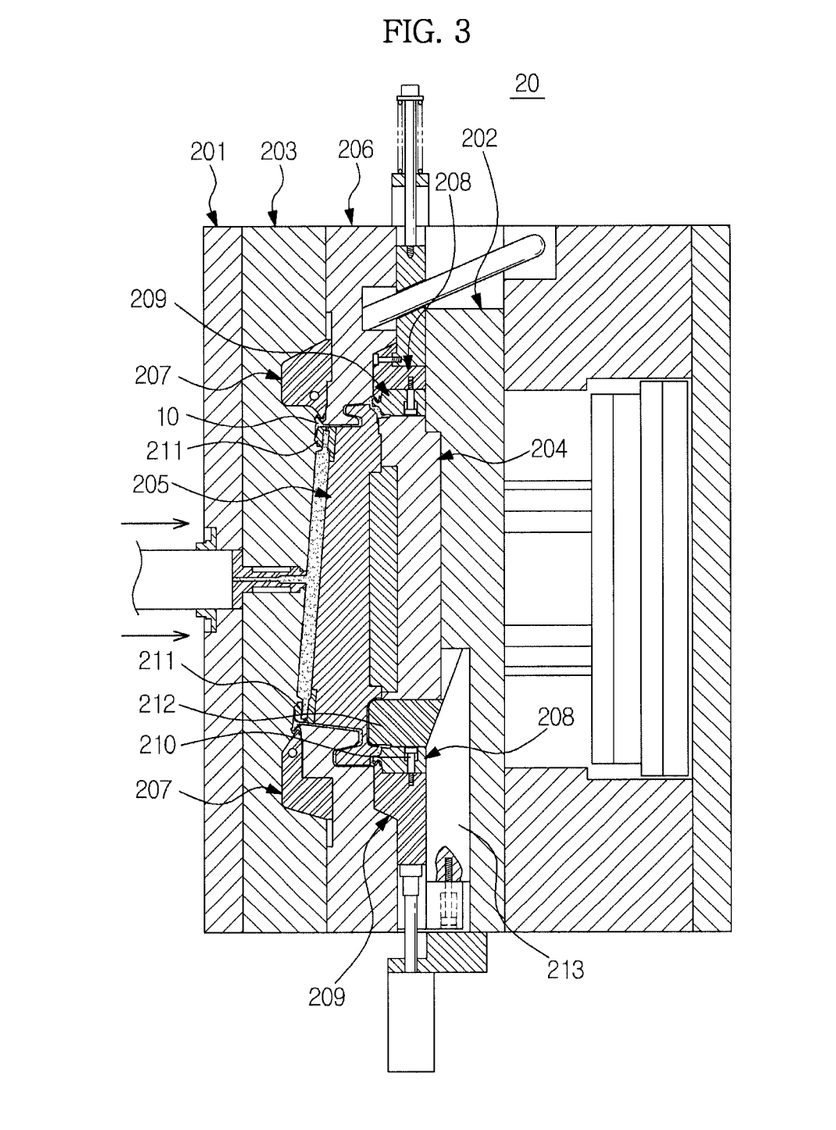
FIGS. 3, 5, 6 and 9 are sectional views showing the operation of the injection mold for washing machine diaphragms according to an embodiment of the present invention.

FIGS. 2 and 3 show an injection mold 20 used to manufacture the washing machine diaphragm 10.

The injection mold 20 includes a first fixing plate 201, a second fixing plate 202, a first core 203 fixedly mounted to the first fixing plate 201, a second core 204 fixedly mounted to the second fixing plate 201, the second core 203 being opposite to the first core 203, a first intermediate core 205 disposed between the first core 203 and the second core 204, the outer side of the first intermediate core 205 corresponding to the inner side of a diaphragm 10 to be manufactured, and a second intermediate core 206 disposed outside the first intermediate core 205, the inner side of the second intermediate core 206 corresponding to the outer side of a diaphragm 10 to be manufactured.

The first core 203 or the second core 204 may be movable to change the distance between the first core 203 and the second core 204. In this embodiment, the first core 203 is movable so that the first core 203 moves toward or away from the second core 204. Also, the first intermediate core 205 and the second intermediate core 206 are movably disposed between the first core 203 and the second core 204.

Also, the injection mold 20 may include a plurality of slide cores 207, 208 and 209 to form the first undercut 12 and the second undercut 13 of the diaphragm 10. The slide cores 207, 208 and 209 include a first slide core 207 movably mounted to the second intermediate core 206 to form the first undercut 12 and second and third slide cores 208 and 209 movably mounted to the second fixing plate 202 to form the second undercut 13.

Consequently, a cavity of a shape corresponding to a diaphragm 10 to be manufactured may be defined among the first core 203, the second core 204, the first intermediate core 205, the second intermediate core 206, the first slide core 207, the second slide core 208, and the third slide core 209. The first slide core 207 may include a plurality of first slide cores 207. The second slide core 208 may include a plurality of second slide cores 208. The third slide core 209 may include a plurality of third slide cores 209. The first slide cores 207, the second slide cores 208 and the third slide cores 209 are movable in the radial direction so that a diaphragm 10 is separated from the cavity after the second slide cores 208 and the third slide cores 209 are moved outward in the radial direction.

The second slide core 208 may be interlocked with the third slide core 209. To this end, the second slide core 208 may be connected to the third slide core 209 via an interlocking pin 210. After the third slide core 209 is moved a predetermined distance, the second slide core 208 is moved by force transmitted via the interlocking pin 210.

Also, the injection mold 20 includes a runner 205a to uniformly supply a thermoplastic elastic body, which is injected in a molten state from an injection device, into the cavity and a gate 211a provided between the runner 205a and the cavity to inject the thermoplastic elastic body supplied in the molten state through the runner 205a into the cavity. In this embodiment, the runner 205a is provided in the first intermediate core 205, and the gate 211a is provided in a gate member 211 disposed between the runner 205a and the cavity.

The thermoplastic elastic body injected into the cavity may be a mixture of polypropylene and EPDM, a mixture of nitrile butadiene rubber (NBR) and polyvinyl chloride (PVC) or a mixture of natural rubber and polypropylene. That is, the thermoplastic elastic body includes a mixture of different materials. When such materials are injected into the cavity in a molten and mixed state, therefore, the same materials may lump. If the same materials are injected and cured in a lumped state, a manufactured diaphragm 10 may have a striped pattern, which deteriorates product aesthetics.

Figure 4:
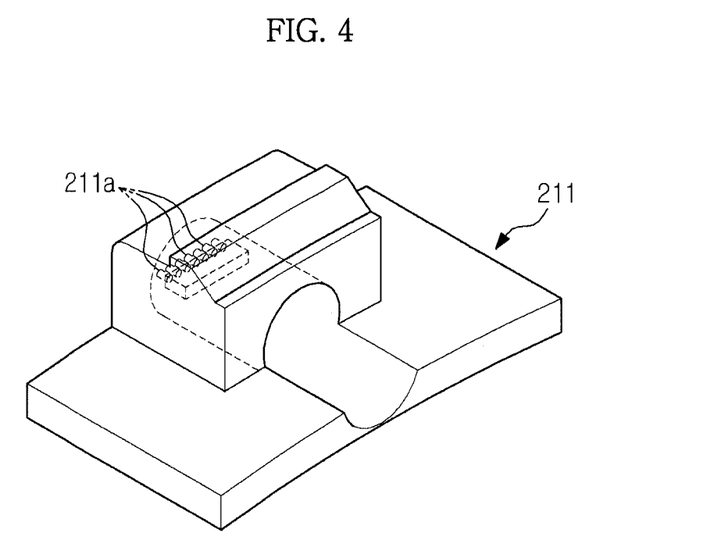
FIG. 4 is a perspective view showing a gate member applied to the injection mold for washing machine diaphragms according to an embodiment of the present invention.

For this reason, as shown in FIG. 4, the gate 211a may be constituted by a plurality of pin holes, through which the materials constituting the thermoplastic elastic body are injected into the cavity in a more uniformly mixed state. That is, the gate 211a constituted by the pin holes is formed in the gate member 211.

In a case in which the gate 211a is constituted by the pin holes as described above, the thermoplastic elastic body supplied through the runner 205a in a state in which the same materials lump passes through the gate 211a constituted by the pin holes with the result that the materials constituting the thermoplastic elastic body are uniformly mixed, and therefore, the manufactured diaphragm 10 has a reduced striped pattern.

Referring back to FIGS. 2 and 3, the injection mold 20 may be configured to automatically separate the manufactured diaphragm 10 from the cavity.

To this end, the remainder of the first slide cores 207 excluding the uppermost first slide core 207 is simultaneously moved outward in the radial direction before or as the first core 203 is separated from the first intermediate core 205 and the second intermediate core 206. Also, the uppermost first slide core 207 is moved outward in the radial direction after the first core 203 is separated from the first intermediate core 205 and the second intermediate core 206. That is, the upper part of the first step of the manufactured diaphragm 10 is movable along with the first core 203 in a state in which the upper part of the first step of the manufactured diaphragm 10 is caught between the uppermost first slide core 207 and the second intermediate core 206.

A cam core 212 may be movably mounted to the bottom of the second core 204 to support the lower end of the manufactured diaphragm 10. The cam core 212 protrudes from the second core 204 or moves toward the second fixing plate 202 according to movement of a cam slide 213 movably mounted to the second fixing plate 202 so that the cam core 212 supports the lower end of the manufactured diaphragm 10 or is separated from the manufactured diaphragm 10.

Hereinafter, a process via which the manufactured diaphragm 10 is automatically separated from the injection mole with the above-stated construction will be described in detail with the accompanying drawings.

Figure 5:
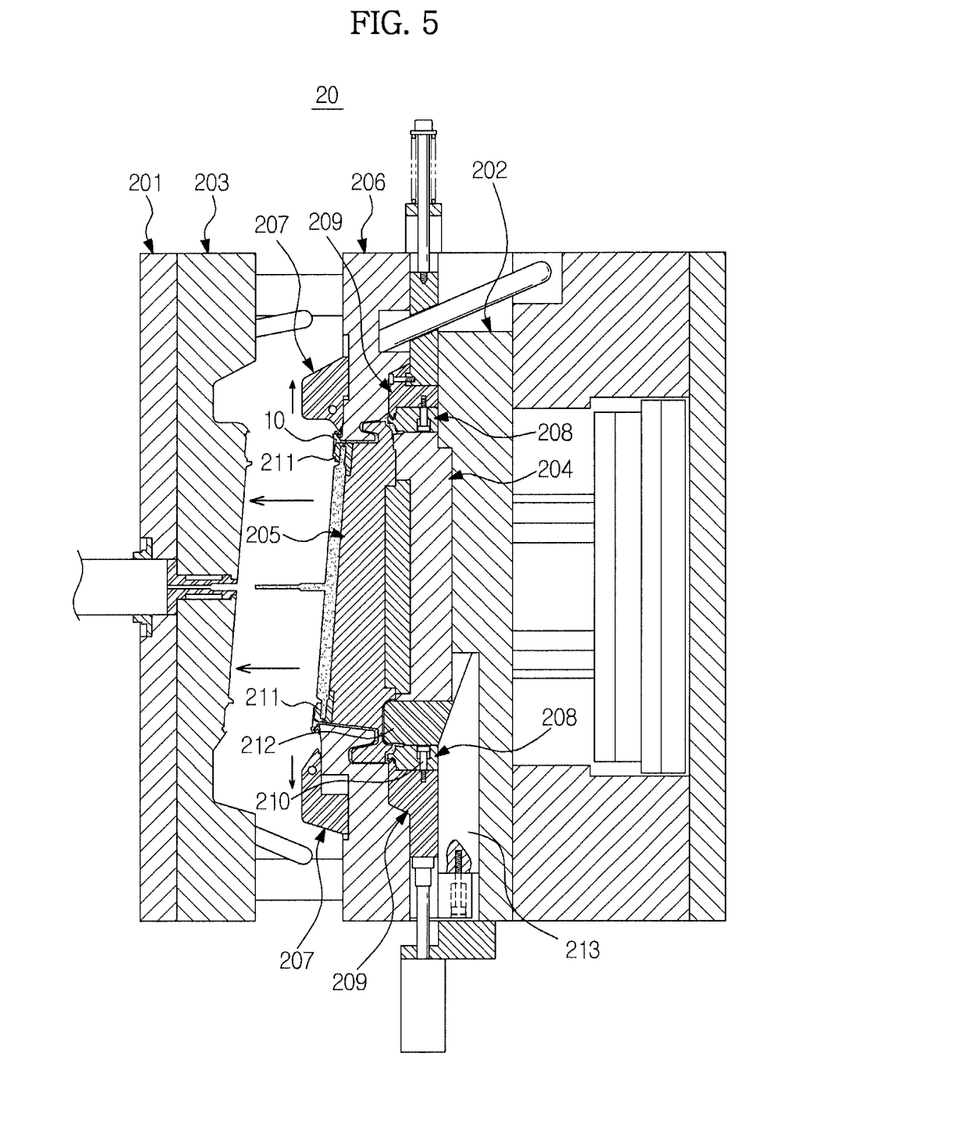

First, upon completing manufacture of a diaphragm 10 in the cavity as shown in FIG. 3, the first fixing plate 201 is moved as shown in FIG. 5 so that the first core 203 is separated from the first intermediate core 205 and the second intermediate core 206. At the same time, the remainder of the first slide cores 207 excluding the uppermost first slide core 207 is simultaneously moved outward in the radial direction. As a result, only a portion of the first undercut 12 located at the upper part of the first step of the manufactured diaphragm 10 is caught between the uppermost first slide core 207 and the second intermediate core 206.

Figure 7:
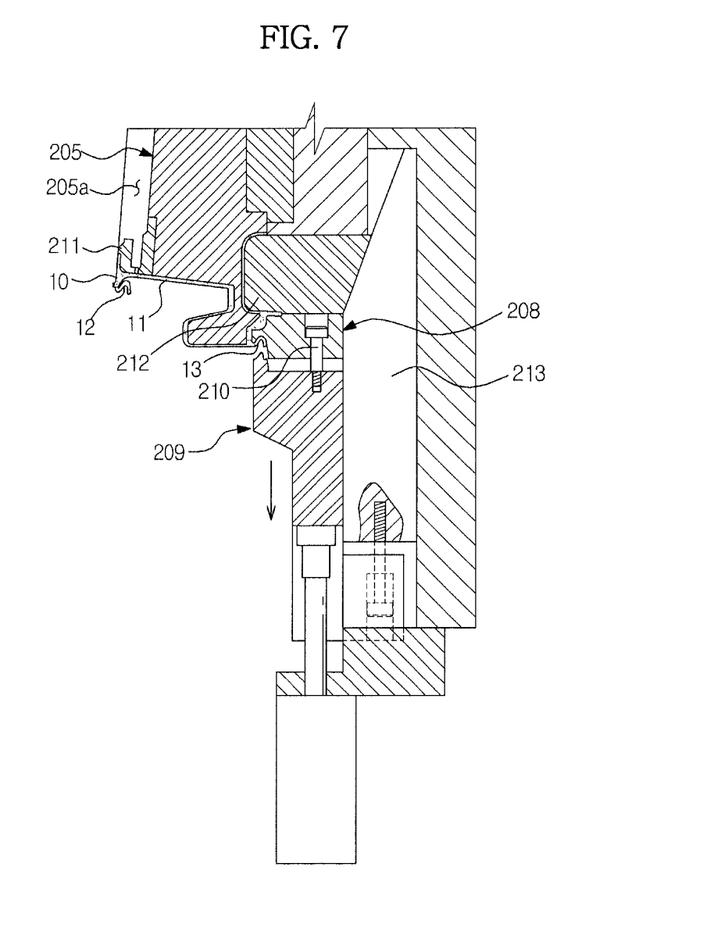
FIGS. 7, 8 and 10 are sectional views showing operations of second and third slide cores.
Figure 8:
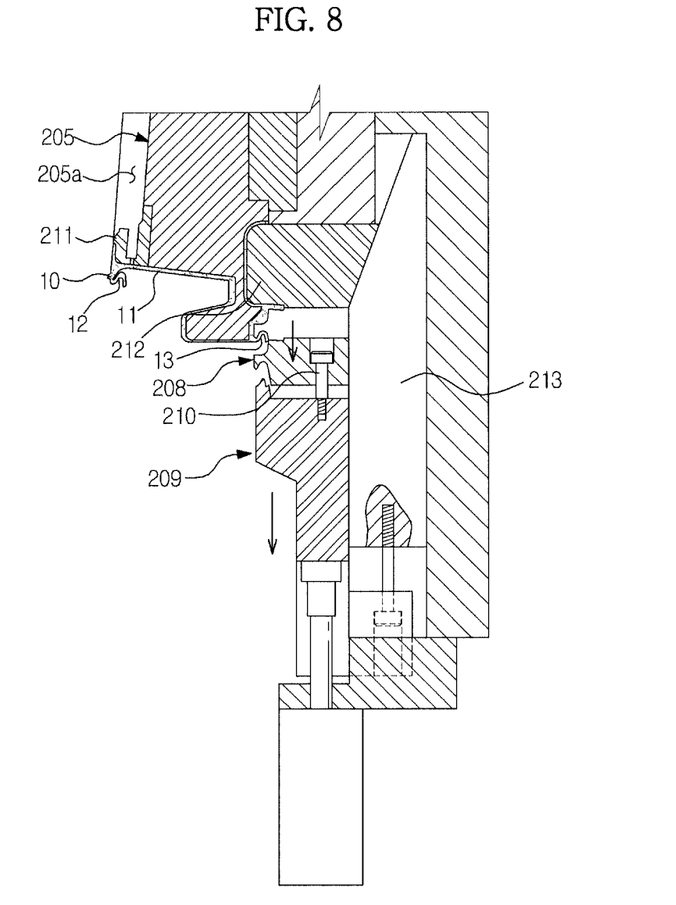

At the same time, the third slide core 209 is moved a predetermined distance as shown in FIG. 7. Subsequently, the second slide core 208 is moved along with the third slide core 209 by the interlocking pin 210 as shown in FIG. 8. As a result, the second undercut 13 of the diaphragm 10, caught between the third slide core 209 and the second slide core 208, is temporarily elastically deformed so that the second undercut 13 is separated from the third slide core 209 and the second slide core 208. Consequently, the lower part of the second step of the manufactured diaphragm 10 is caught between the cam core 212 and the first intermediate core 205.

Figure 6:
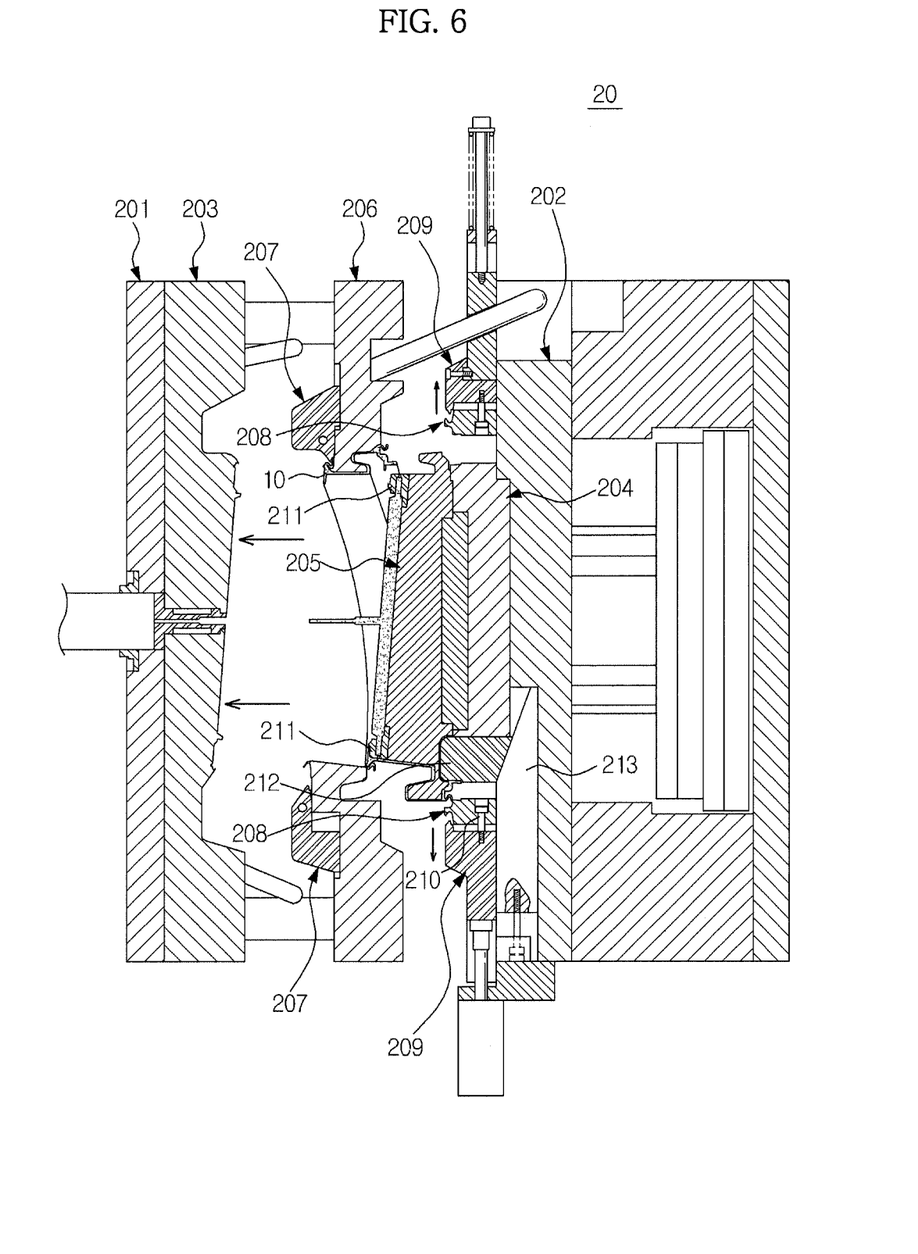

When the second intermediate core 206 is moved so that the second intermediate core 206 is separated from the second fixing plate 202, as shown in FIG. 6, in a state in which the upper part of the first step of the diaphragm 10 is caught between the first slide core 207 and the second intermediate core 206 and the lower part of the second step of the diaphragm 10 is caught between the cam core 212 and the second intermediate core 206, the second undercut 13 of the diaphragm 10 caught by the first intermediate core 205 is temporarily elastically deformed with the result that the remainder of the second undercut 13 excluding a portion of the second undercut 13 caught by the cam core 212 is separated from the first intermediate core 205.

Figure 9:
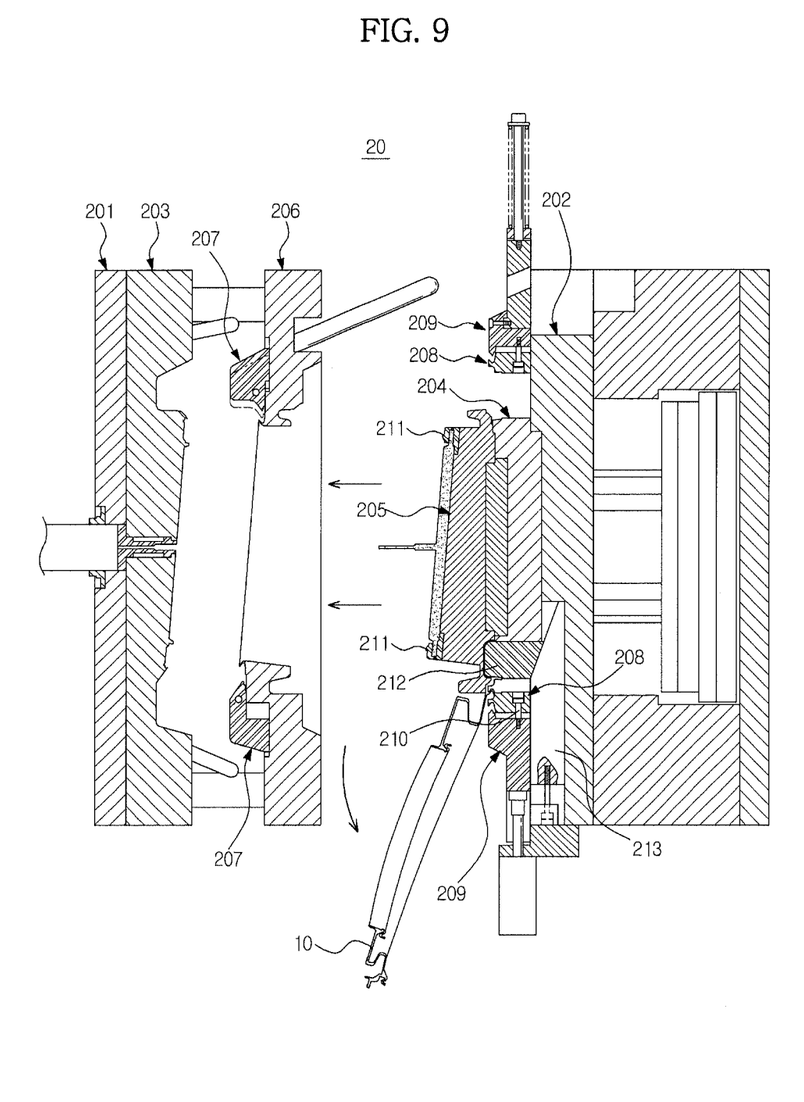

When the second intermediate core 206 is continuously moved so that the uppermost slide core 207 is moved outward in the radial direction, the first undercut 12 at the upper part of the first step of the diaphragm 10 is separated from the second slide core 208 as shown in FIG. 9 and rotates about a portion caught by the cam core 212 by weight with the result that the upper end of the diaphragm 10 falls downward. Consequently, the other portion excluding a portion caught by the cam core 212 is separated from the first intermediate core 205.

Figure 10:
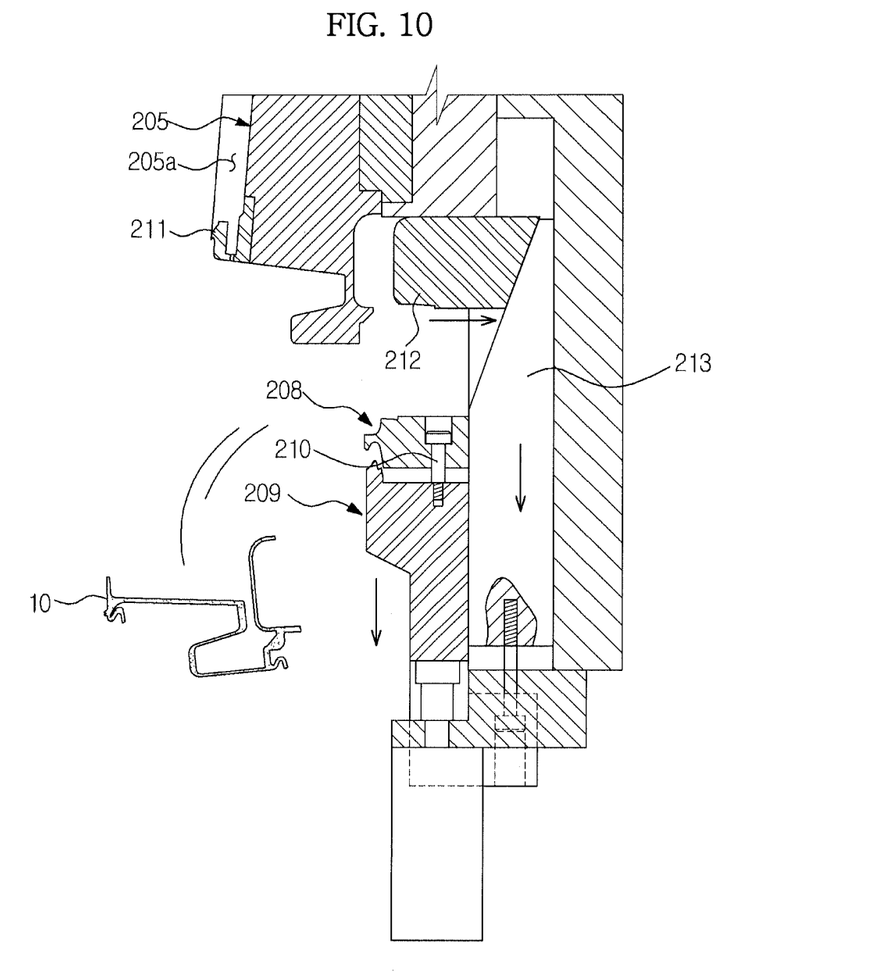

When the cam slide 213 is moved downward as shown in FIG. 10 in this state, the cam core 212 is moved toward the second fixing plate 202 according to movement of the cam slide 213 with the result that the cam core 212 is separated from the lower part of the second step of the diaphragm 10. Consequently, the diaphragm 10 is separated from the first intermediate core 205 and falls downward by weight.

Through the above-described process, the diaphragm manufactured in the cavity is automatically separated from the injection mold.

As is apparent from the above description, the operations of the uppermost first slide core to support the upper part of the first step of the diaphragm manufactured in the cavity and the cam core to support the lower part of the second step of the manufactured diaphragm are controlled to automatically separate the manufactured diaphragm from the cavity.

Also, the materials constituting the molten thermoplastic elastic body are uniformly mixed while passing through the gate constituted by the pin holes, thereby reducing a stripped pattern of the diaphragm.

The disclosure herein has provided example embodiments of an injection mold used to manufacture a diaphragm used in washing machines, however the disclosure is not limited to specific embodiments. For example, the thermoplastic elastic body has been described as being a mixture of different materials. Accordingly, the thermoplastic elastic body is not limited to the particular examples of mixtures described herein, but may include other thermoplastic elastic bodies which may be used to manufacture a diaphragm.

Although the embodiments disclosed herein have been shown and described, it would be appreciated by those skilled in the art that changes may be made to these embodiments without departing from the principles and spirit of the invention, the scope of which is defined by the claims and their equivalents.

What is claimed is:

1. A method of automatically separating a diaphragm for a washing machine manufactured using an injection mold, the method comprising:
    separating a first core from a first intermediate core and a second intermediate core;
    moving a plurality of remainder first slide cores, which comprises a plurality of first slide cores excluding an uppermost first slide core, in an outward radial direction of the diaphragm, to cause an upper portion of the diaphragm to be caught between the uppermost first slide core and the second intermediate core;
    moving a plurality of second slide cores and a plurality of third slide cores to cause a lower portion of the diaphragm to be caught between the first intermediate core and a movable cam core disposed in a bottom part of a second core disposed opposite of the first core;
    moving the second intermediate core in an outward radial direction of the diaphragm to separate the upper portion of the diaphragm from the plurality of second slide cores, to cause the upper portion of the diaphragm to be released from the first intermediate core; and
    separating the cam core from the lower portion of the diaphragm, to cause the lower portion of the diaphragm to be released from the first intermediate core.

2. The method of claim 1, wherein separating the first core from the first intermediate core and the second intermediate core, and the moving the plurality of remainder first slide cores in an outward radial direction of the diaphragm, are performed simultaneously.

3. The method of claim 1, wherein the separating the cam core from the lower part of the diaphragm comprises moving a cam slide in a downward direction of gravity to move the cam core toward a fixing plate according to the movement of the cam slide.

4. The method of claim 1, wherein the separating the cam core from the lower part of the diaphragm comprises moving a cam slide disposed in a fixing plate in a downward direction of gravity to move the cam core toward the fixing plate, according to the movement of the cam slide.

5. The method of claim 1, wherein the plurality of second slide cores and the plurality of third slide cores are moved together using an interlocking pin.

* * * * *